Nov. 27, 1951 A. M. CHAMBERS, JR Re. 23,431

OIL SEAL

Original Filed Aug. 4, 1948

INVENTOR
ALBERT M. CHAMBERS JR.

BY
Fraser, Myers & Manley
ATTORNEYS

Reissued Nov. 27, 1951

Re. 23,431

UNITED STATES PATENT OFFICE 23,431

OIL SEAL

Albert M. Chambers, Jr., Palmyra, N. Y., assignor to The Garlock Packing Company, Palmyra, N. Y., a corporation of New York Original No. 2,542,234, dated February 20, 1951, Serial No. 42,375, August 4, 1948. Application for reissue June 9, 1951, Serial No. 230,827

8 Claims. (Cl. 288—3)

Matter enclosed in heavy brackets [ ] appears in the original patent but forms no part of this reissue specification; matter printed in italics indicates the additions made by reissue.

The present invention relates to oil seals such as are used for sealing an annular space between two relatively movable machine elements, such as for example, a rotatable shaft and an opening in a machine housing through which the shaft extends; and the invention relates also to an improved economical method of producing such oil seals.

Such oil seals have commonly included a cylindrical metal shell within or upon which a flexible sealing ring has been mounted. The shell ordinarily is press-fitted within or upon one of the two machine elements being sealed, and the sealing ring ordinarily effects a seal both with the mentioned cylindrical shell and with the other machine element. The mentioned flexible sealing elements have usually been provided with a radially extending base portion which effects a seal at its periphery with a cylindrical portion of the shell, and also have been provided with an integral axially extending sealing flange which effects a running seal with a shaft or other machine element being sealed.

In oil seal structures as hereinbefore described, it has usually been considered desirable to provide spring means either in the form of a flat metal finger spring or a garter coil spring disposed at the side of the sealing flange remote from the latter's sealing surface, such a spring being provided to assure adequate sealing contact of the sealing flange.

One condition, which heretofore has limited the measure of economy that could be introduced into the production of such oil seals, has arisen from the fact that the sealing ring ordinarily has been made entirely of relatively soft flexible material, such as soft rubber or synthetic rubber or equivalent flexible material (all of which materials are hereinafter referred to for convenience merely as "rubber"), and the mentioned radially extending base portion of the sealing ring, in consequence, has been so yieldable that it has been necessary to place separate rigid supporting means at opposite sides thereof to hold it in its proper position and to enable said base portion to properly support the sealing flange which is integral therewith. Thus, it has been common practice to have one metal ring, sometimes called a filler ring, disposed at one side of the base portion of the sealing element and to have another separate metal ring disposed at the opposite side thereof, and then to have all three mentioned parts clamped within the metal shell of the oil seal to constitute the latter as a unitary structure.

Another drawback in prior structures has arisen from the fact that the mentioned metal rings, employed at opposite sides of the base portion of the sealing element, necessarily had to extend from a periphery of the mentioned base portion, radially, to a substantial extent, toward a point where the sealing flange adjoins the mentioned base portion. This condition usually causes one of the mentioned supporting rings, usually the filler ring, to limit the radial space available for flexing of the sealing flange in response to malalignment as between the two machine elements being sealed, or in response to whipping of one of said elements when rotating at high speeds.

In addition, it has been found that for some purposes a garter coil spring is to be preferred over a flat metal spring; and as such a garter spring is considerably thicker and requires more clear space for radial flexing with a sealing flange in the presence of such malalignment or whipping action, it follows that the use of a filler ring of substantial radial dimensions severely limits the freedom of flexing of the sealing flange with such an associated garter spring, and also, requires that the oil seal be of substantial dimension through a radial section thereof.

The mentioned difficulty, wherein a filler ring of substantial radial dimension has operated to limit the possible radial flexing of the sealing flange, has been overcome by using two rings in place of a single filler ring, one of said rings functioning to support the radially extending portion of the sealing element and the other ring being of reduced radial dimension and serving as a filler, while, nevertheless, permitting sufficient flexing of the sealing flange. This last-mentioned expedient, however, introduces another element into the assembly with attendant excessive costs of manufacture and assembly.

Another drawback of prior oil seal structures arises from the fact that where supporting rings are used at opposite sides of the base portion of a flexible sealing element said rings usually contact the cylindrical portion of the oil seal and only a relatively small peripheral surface of the sealing element contacts the shell. Thus, the sealing effect between the sealing element and the shell is severely limited, and the metal-to-metal contact between the several supporting rings and the shell does not form as good a seal as could be desired.

According to the present invention, these difficulties are obviated by molding the flexible sealing element directly upon a metal ring, which gives to the base portion of the sealing element all the support that it requires. In addition, this metal ring is purposely designed so that it does not extend to the periphery of the base portion of the sealing element which is in sealing contact with the cylindrical part of the shell, so that a very substantial peripheral area of the rubber portion of the base of the sealing ring is in intimate and very effective sealing contact with the shell.

In addition, by providing this metal ring molded as an integral part of the sealing element, it is possible *to omit the filler ring or* to employ a single filler ring which need only engage the base portion of the sealing element at a relatively limited marginal portion adjacent the periphery thereof. Hence, the filler ring may be relatively small in radial dimension and, as a result, the oil seal may be of much smaller radial sectional dimension than would otherwise be possible and yet afford ample room for the flexing of the sealing flange and a garter coil spring as a result of the mentioned malalignment or whipping action.

A drawback heretofore encountered in connection with the production of such oil seals has been the necessity of providing separate molds for forming the different sizes of sealing elements needed for each different radial size of oil seal. According to the present invention, a quantity of oversize sealing elements may be molded in a single mold assembly and then be cut to the different sizes needed in the different sizes of oil seals to be produced, so that, from a single mold, it is possible to produce the sealing elements in volume for a variety of sizes of oil seals.

Thus, an important object of the present invention is the provision of a flexible sealing element having a base portion with a rigid stiffening ring fixed thereto in the production of the sealing element, thereby substantially obviating the need for other radial support of the base portion when the sealing element is assembled in a complete oil seal.

Another important object of the invention is the provision of a sealing element having a self-supporting base portion and also having a relatively soft rubber peripheral portion of substantial area for sealing contact with the oil seal shell.

Another important object of the invention is the provision of spacing or filler means in association with such a self-supporting base portion of a sealing element which need only coact with a relatively limited side area near the periphery of the said base portion of such a sealing element, and, hence may be of very limited radial dimension, thereby affording ample space for flexing of the sealing flange and of a garter spring associated with the latter, and also permitting the production of an oil seal of substantially limited radial [section] *sectional* dimension.

Another important object is the provision of an improved method of manufacturing such oil seals in quantities of different sizes.

The foregoing and other objects are accomplished in an oil seal and in the production of an oil seal of which several illustrative embodiments are shown in the accompanying drawing, in which.

Figure 1:
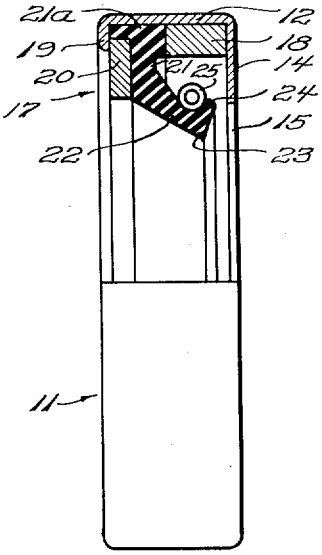
Figure 1 is an elevation of a preferred embodiment of an oil seal according to this invention, partly cut away to show the oil seal in radial section.
Figure 3:
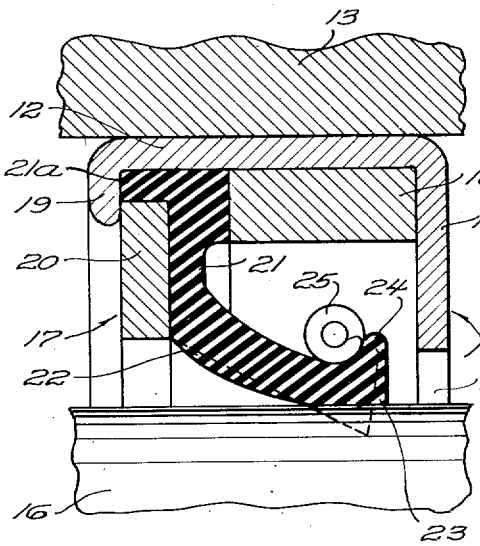
Fig. 3 is an enlarged view of the portion of the oil seal which is shown in section in Fig. 1, but illustrated in association with a machine casing and a shaft therein of which only fragmentary portions are shown.

Referring first to Figs. 1 and 3, the oil seal comprises a somewhat cup-shaped metal shell 11 having a cylindrical wall 12 of a diameter affording a substantially oil-tight press-fit within a circular opening in a machine casing 13 or the like, and an integral radial flange 14 defining a circular opening 15 through which may extend a shaft 16.

Within the shell 11 are disposed a sealing element 17 and a filler ring 18, which are held within the shell in side-by-side relationship by being clamped between the flange 14 at one side of the shell and a somewhat smaller radial flange 19 which is formed by swaging in an edge portion of the cylindrical wall 12 of the shell after the sealing element 17 and the filler ring 18 have been disposed in said shell.

The sealing element 17 has an annular stiffening portion 20 which may preferably be of suitable metal, but optionally may be formed of other materials of sufficient stiffness, such as for example, relatively hard plastic material. The remainder of the sealing element 17 preferably is of relatively soft flexible rubber or equivalent material, and comprises a radially extending base portion 21, preferably bonded upon the stiffening portion 20 or otherwise suitably fixed thereto, and a sealing flange 22 which is integral with the base portion 21 and has a sealing lip 23 in running sealing engagement with the shaft 16.

It is to be observed that the base portion 21 of the sealing element preferably extends radially outwardly to a greater extent than the stiffening portion 20, and that a marginal or outer peripheral portion 21a overlies the periphery of the stiffening portion 20 and presents a substantial area of the soft rubber material of the sealing element in firm sealing engagement with the inner surfaces of the portions 12 and 19 of the shell.

The sealing flange 22 preferably is formed with an integral annular rib 24 which aids substantially in holding in place a garter coil spring 25 which exerts a compressive force upon the sealing flange 22, thereby enhancing the sealing engagement of the sealing lip 23 with the shaft 16.

It may be seen that the swaged-in flange 19 need extend inwardly only sufficiently to bring its inner periphery into axial alignment with the outer marginal portion of the stiffening portion 20, thus to impose a firm clamping force upon the sealing element at the left side thereof as viewed in the drawings. At the opposite side of the sealing element, it may be observed that the filler ring 18 need extend inwardly from the cylindrical wall 12 of the shell only to an extent substantially corresponding to the radially inward extension of the radial flange 19, whereby to constitute with the latter a clamp for holding the sealing element 17 firmly in place in the assembly. The filler ring 18 is not relied upon to afford support for the base portion 21 of the sealing element for that element derives all the support which it needs from the stiffening portion 20.

Inasmuch as the filler ring 18 is of relatively small dimension radially, it will be seen that in the structures as illustrated in Figs. 1 and 3 the sealing flange 22 may flex radially outwardly to a considerable extent in response either to malalignment of the shaft or whipping of the latter without the filler ring in any way limiting such action of the flange and of the garter spring 25 associated therewith.

Figure 2:
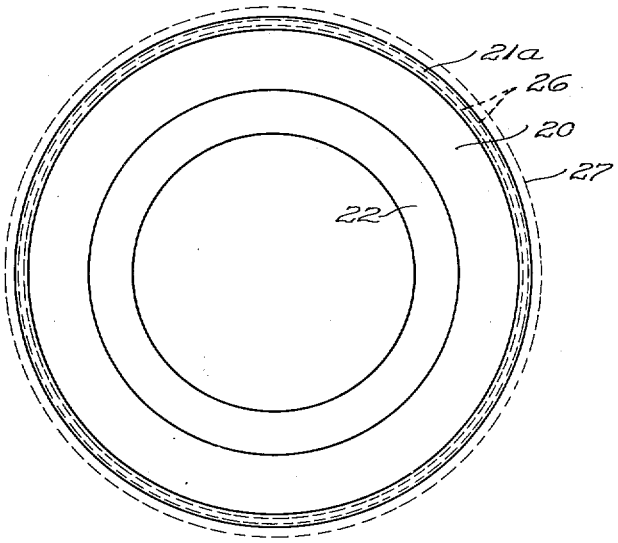
Fig. 2 is an elevation of the sealing element shown in Fig. 1 as viewed from the left side of that figure.

From Fig. 2, it may be seen that the portion 21a in a sealing ring, as molded, may extend substantially beyond the outer periphery of the stiffening portion 20 and that to adapt sealing elements taken from a given single mold for use in oil seals of various radial dimensions, it is necessary only to trim off outer marginal portions of the molded sealing element along circular lines such as will give the sealing element the desired over-all outside diameter; several such lines being indicated by broken lines at 26 in the drawing. A broken line 27 indicates the original possible periphery of a molded element from which the sealing element may have been cut to cause it to fit in the assembly as shown in Fig. 1.

It should be obvious that with the use of a single mold, it is possible to mold an over-size sealing element and that such an over-size element from a single mold may be trimmed to any one of a substantial variety of outside diameters so that the single mold may serve to produce sealing elements for a variety of radial sizes of oil seals. Except for this arrangement, it would obviously be necessary to provide for separate molds for each size of sealing element and thus the mold cost would be duplicated for each and every radial size of oil seal to be produced.

Figure 4:
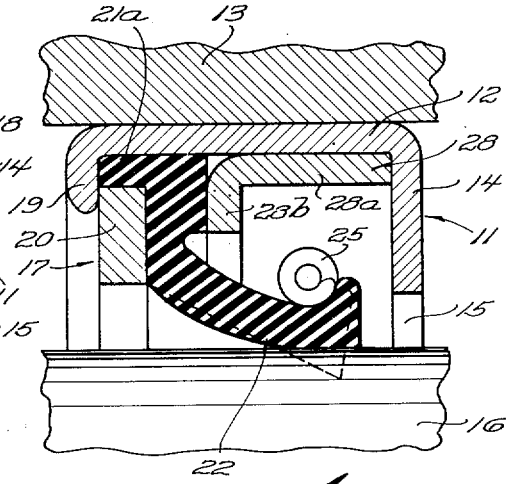
Fig. 4 is a view similar to Fig. 3, but illustrating another preferred embodiment of the invention in which the oil seal is of somewhat reduced radial sectional diameter.

Fig. 4 serves to illustrate how it is possible in a structure according to this invention to provide an oil seal of considerably reduced radial sectional diameter, which, however, will permit ample uninhibited flexing of the sealing flange and a garter coil spring associated therewith. Aside from the mentioned permissible reduction in the radial sectional dimension of the embodiment illustrated in Fig. 4, the principal difference of this embodiment, as compared to that illustrated in Figs. 1 and 3, resides in the provision of a modified filler ring 28 which may be of suitable metal and have a cylindrical flange 28a in firm and preferably oil-tight engagement with the inner surface of the cylindrical wall 12 of the shell 11, with the free edge of said cylindrical flange seated firmly against the radial flange 14 of the shell. The filler ring 28 also has an integral radially inwardly extending flange 28b which extends inwardly sufficiently to avoid cutting into or embedding itself in the rubber base portion of the sealing element. The flanges 19 and 28b serve as clamping flanges between which the sealing element 17 is firmly held.

It may be observed that, although the embodiment of Fig. 4 results in an oil seal structure which is of relatively small radial dimension, it, nevertheless, provides ample radial space about the circumference of the garter spring 25 to permit the latter and the sealing flange 22 to flex uninhibitedly to a considerable extent if necessary in the presence of malalignment or whipping of the shaft. It will also be perceived that, by employing the principles of the present invention, an oil seal like that of Figure 4 could be of even smaller radially sectional dimension than shown, in relation to the other dimensions thereof.

In both the described embodiments, it may be seen that the portion 21a of the sealing element presents a very substantial sealing surface in contact with the shell 11 and it will also be understood that, in assembling such devices, a substantial amount of axial pressure is set up in the sealing element as a result of the swaging-in of the flange 19 of the shell. This axial pressure is substantially effective upon the flexible portion of the sealing element, located in the area directly between the filler ring 18 (or 28), the stiffening portion 20 and the portion of the shell which is in contact with the portion 21a of the sealing element, so that the rubber constituting the latter, and located within the described area, is literally squeezed to cause it to tend to flow in all directions when the flange 19 is swaged-in, and this squeezing effect induces an improved sealing effect between the mentioned rubber portion of the sealing element and the various parts of the seal with which it is associated.

In addition to the advantages particularly pointed out in the detailed description of the illustrated embodiments, it should be obvious that the illustrated structures serve to fulfill the various objects hereinbefore recited.

It should also be obvious that the principles of this invention may also be employed in an oil seal which is fixed to an inner machine element and effects a running seal with an outer machine element; also that various structures other than those illustrated in the drawings, may be employed to utilize the present inventive concept, without, however, departing from the invention defined [from] *in* the following claims.

What I claim is:

1. A sealing device for sealing an annular space between two relatively rotatable machine elements, comprising an annular, relatively rigid shell adapted for fixed sealing engagement with one of said machine elements and having a cylindrical wall and a first radial flange; an annular sealing element having a radially extending base portion in substantial axial alignment with and spaced axially from said radial flange and having a first peripheral portion of relatively soft, deformable material in fixed sealing contact over its entire axial width with said cylindrical wall and having a second peripheral portion adapted for running sealing engagement with the other of said machine elements; a filler ring disposed between said base portion and said first radial flange; and the said shell having a second radial flange extending alongside the said base portion at the side thereof remote from said filler ring; the said base portion having an integral, annular, substantially flat stiffening member embedded therein at one side thereof and in contact with said second radial flange and spaced from said cylindrical wall; and the said first peripheral portion extending about and in radial alignment with said stiffening member and being of greater axial thickness than the latter; the said first peripheral portion of deformable material and the said stiffening member being at least partly in substantial axial alignment with the said filler ring and with said second radial flange of the shell and under substantial axial compression therebetween, whereby to deform said deformable peripheral portion of the sealing ring into enhanced sealing contact with the cylindrical wall of the shell.

2. A sealing device according to claim 1, the said base portion of the sealing element, including its mentioned stiffening member, having an annular marginal portion of increased overall axial thickness adjacent said cylindrical wall, the added thickness being of soft deformable material partly constituting said first peripheral portion of the sealing element and on the side of the base portion of the sealing element which is adjacent the filler ring; and the adjacent side of the filler ring being of a size which is at least substantially coextensive with the adjacent face of the said thickened portion; whereby the thickened portion increases the mass of the soft deformable material adjacent the cylindrical wall and, hence, facilitates the capacity of said deformable material to effectively seal with said wall of the shell.

3. A sealing device for sealing an annular space between a rotatable shaft and an opening in a machine part through which the shaft extends, comprising a cup shaped shell having an apertured bottom through which the shaft may extend, and a cylindrical wall; a filler ring within said shell in intimate contact with said bottom and said wall; a sealing element comprising a rubber sealing member having a radial web, a sleeve-like sealing flange extending axially from the inner periphery of said web and adapted to effect a running seal with such a shaft, and an outer peripheral portion for effecting a seal with the shell, and a rigid, flat, annular stiffening member fixed to the side of said web remote from the sealing flange and extending radially outwardly short of the cylindrical wall of the shell with the said outer peripheral portion extending between the outer periphery of the stiffening member and the adjacent wall of the shell; and the free edge of the cylindrical wall of the shell extending radially inwardly into position axially overlying both said outer peripheral portion and an outer marginal portion of the stiffening member and in contact with both said outer peripheral portion and said stiffening member, whereby to hold the sealing element within the shell between said last mentioned radially inwardly extending portion of the shell and the filler ring disposed therein.

4. A device for sealing an annular space between two relatively rotatable machine elements comprising a shell having a cylindrical portion with an integral inwardly extending radial flange at one end thereof, a sealing element of relatively soft, flexible rubber-like material in said shell and having a sleeve-like sealing flange for effecting a running seal with one of said relatively rotatable elements and a radial flange extending into contact with the inner surface of the cylindrical portion of said shell, a flat, metal washer integral with the radial flange of the sealing element and disposed at the side thereof remote from the mentioned sleeve-like sealing flange and having an outside diameter less than the inside diameter of the cylindrical portion of the shell with a peripheral portion of the rubber-like material of the sealing element extending between the outer peripheral surface of said washer and the radially opposed adjacent inner cylindrical surface of the shell; a filler ring disposed within the shell in contact at one end with the mentioned radial flange of the shell and at its other end with the radial surface of the radial flange of the sealing element opposite to the side of the radial flange which carries the washer; the free edge of the cylindrical portion of the shell being bent inwardly to such an extent as to embrace and contact an adjacent side of the said peripheral portion of the rubber-like material of the sealing element and to overlie and contact an outer marginal portion of the mentioned washer.

*5. A sealing device for sealing an annular space between two relatively rotatable machine elements, comprising an annular, relatively rigid shell adapted for fixed sealing engagement with one of said machine elements and having a cylindrical wall and a first radial flange; an annular sealing element having a radially extending base portion in substantial axial alignment with said radial flange and having a first peripheral portion of relatively soft, deformable material in fixed sealing contact with said cylindrical wall and having a second peripheral portion adapted for running sealing engagement with the other of said machine elements; and the said shell having a second radial flange extending alongside the said base portion at the side thereof remote from said first flange; the said base portion having an integral, annular, substantially flat stiffening member embedded therein at one side thereof and in contact with said second radial flange and spaced from said cylindrical wall; and the said first peripheral portion extending about and in radial alignment with said stiffening member and being of greater axial thickness than the latter; the said first peripheral portion of deformable material and the said stiffening member being at least partly in substantial axial alignment with said first and second radial flanges of the shell and under substantial axial compression therebetween, whereby to deform said deformable peripheral portion of the sealing ring into enhanced sealing contact with the cylindrical wall of the shell.*

*6. A sealing device according to claim 5, the said base portion of the sealing element, including its mentioned stiffening member, having an annular marginal portion of increased overall axial thickness adjacent said first flange, the added thickness being of soft deformable material partly constituting said first peripheral portion of the sealing element and on the side of the base portion of the sealing element which is adjacent the said first flange; and the adjacent side of the said first flange being of a size which is at least substantially coextensive with the adjacent face of the said thickened portion; whereby the thickened portion increases the mass of the soft deformable material adjacent the cylindrical wall and, hence, facilitates the capacity of said deformable material to effectively seal with said wall of the shell.*

*7. A sealing device for sealing an annular space between a rotatable shaft and an opening in a machine part through which the shaft extends, comprising a cup shaped shell having an apertured bottom through which the shaft may extend, and a cylindrical wall; a sealing element comprising a rubber sealing member having a radial web, a sleeve-like sealing flange extending axially from the inner periphery of said web and adapted to effect a running seal with such a shaft, and an outer peripheral portion for effecting a seal with the shell, and a rigid, flat, annular stiffening member fixed to the side of said web remote from the sealing flange and extending radially outwardly short of the cylindrical wall of the shell with the said outer peripheral portion extending between the outer periphery of the stiffening member and the adjacent wall of the shell; and the free edge of the cylindrical wall of the shell extending radially inwardly into posi-*

*tion axially overlying both said outer peripheral portion and an outer marginal portion of the stiffening member and in contact with both said outer peripheral portion and said stiffening member, whereby to hold the sealing element within the shell between said last mentioned radially inwardly extending portion of the shell and the bottom of the shell.*

*8. A device for sealing an annular space between two relatively rotatable machine elements comprising a shell having a cylindrical portion with an integral inwardly extending radial flange at one end thereof, a sealing element of relatively soft, flexible rubber-like material in said shell and having a sleeve-like sealing flange for effecting a running seal with one of said relatively rotatable elements and a radial flange extending into contact with the inner surface of the cylindrical portion of said shell, a flat, metal washer integral with the radial flange of the sealing element and disposed at the side thereof remote from the mentioned sleeve-like sealing flange and having an outside diameter less than the inside diameter of the cylindrical portion of the shell with a peripheral portion of the rubber-like material of the sealing element extending between the outer*

*peripheral surface of said washer and the radially opposed adjacent inner cylindrical surface of the shell; the free edge of the cylindrical portion of the shell being bent inwardly to such an extent as to embrace and contact an adjacent side of the said peripheral portion of the rubber-like material of the sealing element and to overlie and contact an outer marginal portion of the mentioned washer.*

ALBERT M. CHAMBERS, JR.

REFERENCES CITED

The following references are of record in the file of this patent or the original patent:

UNITED STATES PATENTS

| Number | Name | Date |
|---|---|---|
| 2,040,379 | Heinze | May 12, 1934 |
| 2,061,153 | Heinze | Nov. 17, 1936 |
| 2,106,385 | Springer | Jan. 25, 1938 |
| 2,124,866 | Young | July 26, 1938 |
| 2,227,771 | Victor et al. | Jan. 7, 1941 |

FOREIGN PATENTS

| Number | Country | Date |
|---|---|---|
| 479,743 | Great Britain | of 1938 |